United States Patent [19]

Andersson

[11] 4,222,609

[45] Sep. 16, 1980

[54] SEAT BELT CONDITION INDICATOR

[75] Inventor: Arne Andersson, Klippan, Sweden

[73] Assignee: Klippan Automotive Products AB, Klippan, Sweden

[21] Appl. No.: 921,031

[22] Filed: Jun. 30, 1978

[30] Foreign Application Priority Data

Jul. 4, 1977 [SE] Sweden ................ 7707717

[51] Int. Cl.² ............... A47C 31/00; B60R 21/00
[52] U.S. Cl. ................... 297/468; 297/472; 297/483
[58] Field of Search ........... 297/385, 389, 468, 472, 297/486; 280/744, 747, 801, 808; 248/295, 298

[56] References Cited

U.S. PATENT DOCUMENTS

| 3,311,412 | 3/1967 | Kelly | 297/385 |
| 3,428,362 | 2/1969 | Bertelson et al. | 297/385 |
| 3,438,674 | 4/1969 | Radke et al. | 297/470 |
| 3,877,114 | 4/1975 | Silen | 280/744 |
| 3,981,052 | 9/1976 | Pilarski | 297/389 X |

FOREIGN PATENT DOCUMENTS

| 2551329 | 5/1977 | Fed. Rep. of Germany | 297/385 |
| 1542968 | 9/1968 | France . | |
| 2232201 | 12/1974 | France | 297/385 |
| 305138 | 9/1968 | Sweden . | |
| 402528 | 10/1976 | Sweden . | |

Primary Examiner—James T. McCall
Attorney, Agent, or Firm—Roger H. Criss

[57] ABSTRACT

A bracket assembly device for seat belts comprising a bracket attachable to a vehicle wall by a mounting screw, the bracket comprising front and rear plates having holes for the mounting screw. The front plate forms a slip opening for the webbing or supports a member having such opening. The front plate is movable in essentially a vertical direction relative to the mounting screw and rear plate. The upper displacement position of the front plate is fixed by a member which yields when a predetermined downward directed force on the front plate is exceeded.

5 Claims, 4 Drawing Figures

SEAT BELT CONDITION INDICATOR

The invention relates to bracket assembly devices for seat belts, comprising a bracket attachable to the vehicle wall by a through-screw.

At a relatively early stage in the development of modern seat belts of the three-point type, it was realized that the webbing, under the load to which it can be exposed in a collision or other powerful retardaton of the vehicle, must not be allowed to stretch elastically, since this would give rise to a catapult effect with the risk of breaking the neck of the wearer of the belt. On the other hand, the belt must not stop the body abruptly, but a certain amount of yielding will allow a relatively gentle catching action. These considerations led to the fact that present webbing has plastic stretch, meaning that the seat belt, after it fulfilled its vital function and remained permanently stretched to a greater or lesser degree, would necessarily have to be replaced by a new belt with the correct properties.

In order to be able to know whether a seat belt is ready for replacement it must be possible, in some simple fashion, to establish whether the belt has been exposed to such a stress load that it has become stretched beyond permissible limits. It is an object of this invention to obtain an indication of this condition in a simple and reliable manner by a special bracket attachment assembly device.

To illustrate the invention, an embodiment thereof will be described in more detail below with reference to the attached drawing in which FIG. 1 is a perspective view of a bracket assembly with the device according to the invention in the normal mounting position.

Figure 1:
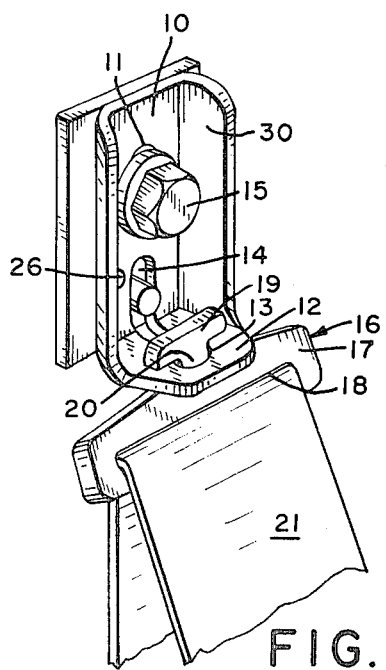

In the embodiment shown in the drawing, the bracket assembly comprises an angle bracket, of which one shank 10 has a hole 11 extending longitudinally to the shank, while the other shank 12 has a circular hole 13. From hole 13, a straight slot 14 extends at right angles to shank 10 and continues through shank 10. Hole 13 with slot 14 thus forms a keyhole which is extended into shank 10.

Angle bracket 10, 12 should be attached to a door pillar or sidewall of a vehicle, by means of a bolt 15 to support an element 16 which somewhat resembles a coathanger. This hanger comprises a wider crosspiece 17 in which a slot 18 with rounded edges is formed, and a narrower crosspiece 19, the two crosspieces being connected together by a neck 20 and being at a slight angle to one another. Hanger 16 is suspended in angle part 10, 12, with crosspiece 19 inserted through slot 14 before the angle part is mounted on the pillar or wall of the vehicle body, so that crosspiece 19 and crosspiece 17 are on the top and bottom, respectively, of flange 12, and neck 20 extends through the hole 13 in this flange. A webbing 21 is threaded through slot 18 in crosspiece 17 of hanger 16, and when the angle part is mounted in place, the hanger can adjust itself in the correct position so that the belt can slide unhindered through slot 18.

The bracket assembly described so far is, in principle, of the same design as the bracket assembly according to Swedish Pat. No. 7 611 299-4.

In the present case, angle part 10, 12 is supplemented by a flat sheet metal plate 22 which has a rectangular form of substantially the same size as shank 10. Plate 22 has a cylindrical hole 23 to receive bolt 15 and a riveted pin 24 fitting in the portion of slot 14 which extends into shank 10. Plate 22 also has a small hole 25 to receive, with a press fit, a pin 26. A corresponding hole 27 is provided for pin 26 in shank 10 of the angle part, with pin 26 being in a loose slip fit in hole 27. Pin 26 forms a shear pin and can consist of a material which is suitable for the purpose; suitably the pin is made of nylon.

Angle part 10, 12 is designed to be mounted with plate 22 between shank 10 and the pillar or wall of the car body by means of bolt 15 in the manner shown in FIG. 1. A cylindrical metal bushing 28 of the same thickness as shank 10 or of insignificantly greater thickness than the latter, is fitted in hole 11 and is traversed by bolt 15. A circular washer 29 is disposed between the head of bolt 15 and one end of bushing 28 on the front of shank 10, while the other end of bushing 28 lies against plate 22 around the circular hole 23 in the latter, which is traversed by bolt 15. The positions relative to one another of angle part 10, 12 and plate 22 are fixed by means of the pin 26 introduced through holes 25 and 27, which pin is flush with the front of shank 10, and in this position bolt 15 with bushing 28 is received in the bottom part of elliptical hole 11 and pin 24 in the bottom part of the part of slot 14 which extends into shank 10. By tightening bolt 15, plate 22 is tightened through washer 29 and bushing 28 against the car body pillar or wall, and a certain pressure is exerted thereby on the front side of shank 10 as well, so that the latter is pressed against plate 22. However, this pressure should not be too great to permit angle part 10, 12, by sufficient downward pressure on shank 12, from being displaced relative to bolt 15 and relative to plate 22 and the latter's pin 24, with shearing of pin 26, without straightening out the two shanks of the angle part. To prevent such straightening out, stiffening and strengthening edge flanges 30 are provided along shank 10, and are joined at their lower ends to shank 12.

Figure 2:
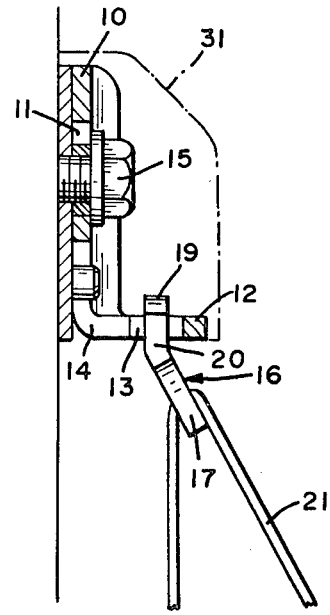
FIG. 2 is a corresponding vertical section of the bracket assembly.

When the attachment is installed, it is suitably enclosed in its entirety by means of a plastic cover 31, whose position is fixed by means of plate 22 and which ends substantially in line with the underside of shank 12 as shown in FIG. 2.

Figure 3:
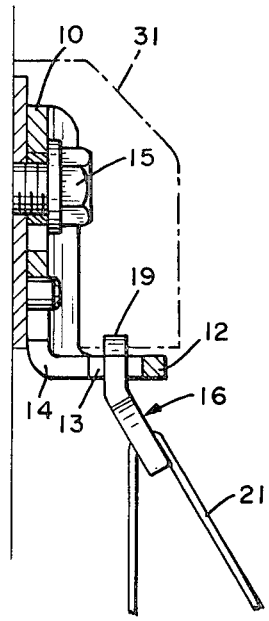
FIG. 3 is a vertical section similar to FIG. 2, of the bracket assembly after it has been exposed to such a heavy load that replacement of the seat belt is required.
Figure 4:
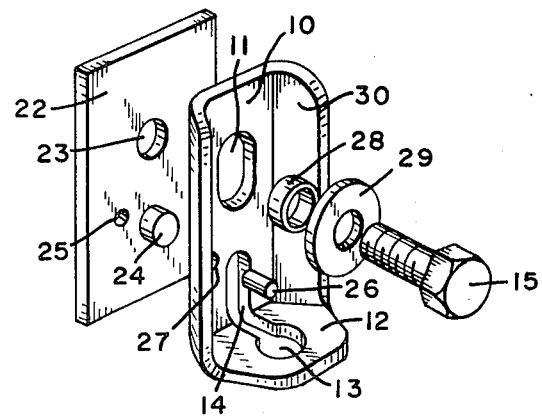
FIG. 4 is an exploded perspective view of the attachment of the bracket assembly.

As indicated in the foregoing, the bracket assembly is normally mounted with the parts of the attachment in the positions relative to one another which are shown in FIGS. 1 and 2. Pin 26 is in place in the two holes 25 and 27, and bolt 15 is in the bottom part of hole 11, while pin 24 is in the bottom part of slot 14, in shank 10 of the angle part. Now, if the webbing 21 is exposed to a tensile force of substantial magnitude, as happens in a collision or powerful retardation of the vehicle in which the seat belt is used, angle part 10, 12 will be displaced downward relative to plate 22 with shearing of pin 26, so that the angle part assumes the position relative to the plate shown in FIG. 3, with bolt 15, or more properly, bushing 28 touching the top of hole 11. This displacement of the angle part, which can be on the order of 3 to 5 mm, will not take place with any normal pull on the belt that would occur when the belt is put on, or with fully normal braking, but only in the case of the substantially more powerful loading of the webbing that would entrain plastic stretching of the belt, implying that it must be replaced before the seat belt is used again.

The displacement of angle part 10, 12 thus constitutes an indication that the webbing is used up and that it is time to replace the entire seat belt, and this indication is read in the fact that shank 12 clearly appears below cover 31, which can be made more apparent if this shank has a conspicuous color. That the seat belt requires replacement is also indicated by the fact that pin 26 has sheared, and, of course, also that angle part 10, 12 is displaced downward relative to plate 22, which can easily be observed by looking at the attachment after removing cover 31 or if there is no cover.

The device according to the invention can also be used with other bracket assemblies than those which are of the type described with a swingably mounted hangar; slot 18 through which the webbing 21 is drawn, can be disposed in a fixed part of angle part 10, 12.

The angle part can be yieldingly fixed to plate 22 simply by tightening bolt 15 more or less against shank 10, or merely by means of shear pin 26, or by both as described in the embodiment described.

I claim:

1. Bracket assembly device for seat belts comprising a bracket (10, 12) attachable to the vehicle wall by a through-screw (15) characterized in that the bracket comprises a rear plate (22) and a front plate (10), both of which are made with holes (23, 11) for the mounting screw (15) and of which the front plate (10) forms a slip opening (18) for the webbing (21) or supports a member (16) that forms this slip opening, and that the front plate (10) is guided for essentially vertical movement relative to mounting screw (15) and rear plate (22) but is fixed in an upper displacement position by a means which yields when a predetermined, downward-directed force on the front plate is exceeded.

2. Device according to claim 1, characterized in that yieldable means is constituted by a shear pin (26) going through both plates (22, 10).

3. Device according to claim 1 or 2, characterized in that the hole (11) in front plate (10) receiving the mounting screw is elliptical and that the plate with another elliptical hole (14) is guided on a pin (24) on the rear plate (22).

4. Device according to one of claims 1–3, characterized in that the front plate (10) is mounted so that in a lower displacement position it will be visible under a bracket cover (31).

5. Device according to one of claims 1–4, characterized in that the front plate (10) forms one shank of an angle part (10, 12) the other shank (12) of which supports a member (16) forming a slip opening (18) for the webbing (21).

* * * * *